United States Patent
Oi et al.

(10) Patent No.: US 6,997,160 B2
(45) Date of Patent: Feb. 14, 2006

(54) CONTROL DEVICE FOR AN INTERNAL COMBUSTION ENGINE

(75) Inventors: Yasuhiro Oi, Numazu (JP); Nobuo Yagihashi, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 11/038,096

(22) Filed: Jan. 21, 2005

(65) Prior Publication Data

US 2005/0166894 A1   Aug. 4, 2005

(30) Foreign Application Priority Data

Jan. 29, 2004 (JP) .............................. 2004-021640

(51) Int. Cl.
 *F02M 41/00* (2006.01)
(52) U.S. Cl. ................................ 123/339.11
(58) Field of Classification Search .......... 123/339.11, 123/339.22, 339.24, 406.47
See application file for complete search history.

(56) References Cited

U.S. PATENT DOCUMENTS

| 5,481,461 | A  | * | 1/1996 | Miyamoto et al. ............ 701/99 |
| 6,513,489 | B1 | * | 2/2003 | Osanai .................... 123/339.11 |
| 6,662,551 | B1 | * | 12/2003 | Majima ...................... 60/284 |
| 6,843,225 | B1 | * | 1/2005 | Ise ........................ 123/339.11 |

FOREIGN PATENT DOCUMENTS

| JP | 2001-090581 A | 4/2001 |
| JP | 2003-254141 A | 9/2003 |

* cited by examiner

*Primary Examiner*—John T. Kwon
(74) *Attorney, Agent, or Firm*—Oliff & Berridge PLC

(57) ABSTRACT

A control device for an internal combustion engine, which makes the engine speed increased rapidly at the engine starting, converge to a target engine speed by a feed-back retard control of an ignition time, is disclosed. In the control device, if the ignition time when the engine speed converges at the target engine speed is in the advance side than a target ignition time, the ignition time is retarded to the target ignition time and an amount of intake air is increased.

3 Claims, 2 Drawing Sheets

CONTROL DEVICE FOR AN INTERNAL COMBUSTION ENGINE

BACKGROUND OF THE INVENTION

1. Field of the Invention

The present invention relates to a control device for an internal combustion engine.

2. Description of the Related Art

In cold engine starting, it is desirable that a catalytic device arranged in the exhaust system is warmed up immediately to purify the exhaust gas soon after the engine starts. To make a catalytic device be warmed up immediately, it is suggested to make an engine speed increased rapidly at the engine starting converge at a target engine speed by retarding of an ignition time. (For example, refer to Japanese Unexamined Patent Publication Nos. 2003-254141 and 2001-90581.)

In the above art, the ignition time is retarded so that the temperature of the exhaust gas increases to promote the warming-up of the catalytic device. Further, if the engine speed is still higher than the target engine speed when the ignition time has been retarded to the target ignition time, an amount of intake air is decreased so as to make the engine speed converge on the target engine speed.

By the way, according to an individual difference of engines, the engine speed may converge at the target engine speed before the ignition time is retarded to the target ignition time. At this case, in the above art, the ignition time is more advanced than the target ignition time so that the temperature of the exhaust gas does not increase sufficiently, and thus the catalytic device cannot be warmed up immediately.

SUMMARY OF THE INVENTION

Therefore, an object of the present invention is to provide a control device for an internal combustion engine, which can surely realize the warming-up of a catalytic device immediately.

According to the present invention, there is provided a control device for an internal combustion engine which makes the engine speed, increased rapidly at the engine start, converge to a target engine speed by a feed-back retard control of an ignition time, characterized in that if the ignition time when the engine speed converges at the target engine speed is in the advance side than a target ignition time, the ignition time is retarded to the target ignition time and an amount of intake air is increased.

According to the above control device, if the ignition time when the engine speed converges at the target engine speed is on the advance side of the target ignition time, the ignition time is retarded at the target ignition time. Thus, the temperature of the exhaust gas increases sufficiently so that the catalytic device can be warmed up immediately. At this time, if nothing is done, the engine speed drops to less than the target engine speed. However, an amount of intake air is increased and thus the engine speed can be maintained at the target engine speed.

The present invention will be more fully understood from the description of preferred embodiments of the invention set forth below, together with the accompanying drawings.

DESCRIPTION OF THE PREFERRED EMBODIMENT

Figure 1:
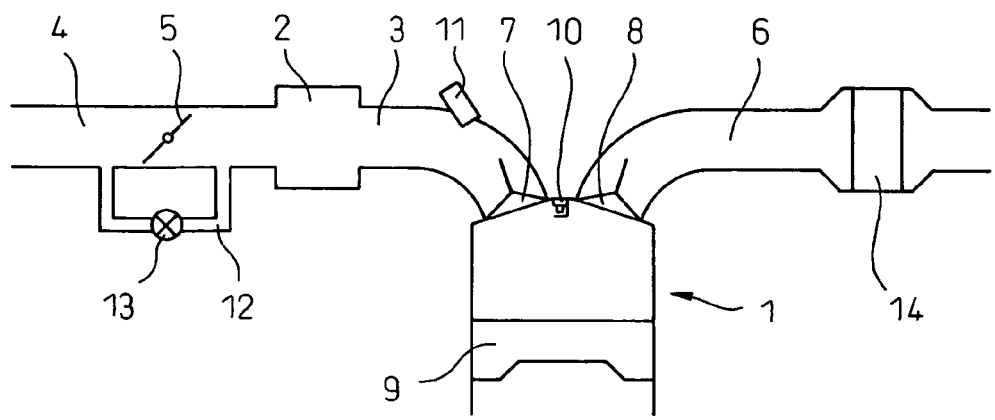
FIG. 1 is a schematic vertical sectional view of an engine provided with a control device according to the present invention.

FIG. 1 is a schematic vertical sectional view of an engine provided with a control device according to the present invention. In FIG. 1, reference numeral 1 designates an engine body, and reference numeral 2 designates a surge-tank in common with each cylinder. Reference numeral 3 designates an intake port communicating the surge-tank 2 with each cylinder, and reference numeral 4 designates an intake passage upstream of the surge-tank 2. In the intake passage 4, a throttle valve 5 is arranged immediately upstream of the surge-tank 2. Reference numeral 6 designates an exhaust manifold communicating with each cylinder.

In the engine body 1, reference numeral 7 designates an intake valve, reference numeral 8 designates an exhaust valve, reference numeral 9 designates a piston, and reference numeral 10 designates an ignition plug. Reference numeral 11 designates a fuel injector arranged in each intake port 3. Reference numeral 12 designates a bypass passage connecting with the intake passage 4 so as to bypass the throttle valve 4, and an idle speed control valve (ISC valve) 13 is arranged therein.

Reference numeral 14 designates a catalytic device arranged downstream of the exhaust manifold 6 in the engine exhaust system. In an engine of the present embodiment that carries out combustion at the stoichiometric air-fuel ratio, the catalytic device 14 is, for example, a three-way catalytic device. In a direct fuel injection-type spark-ignition engine having a fuel injector directly injecting fuel into the cylinder, which carries out combustion at a lean air-fuel ratio, the catalytic device 14 is, for example, a $NO_x$ absorbing and reducing catalytic device. In any event, it is required that a temperature of a catalyst carried on the catalytic device 14 rises more than an activating temperature thereof to purify the exhaust gas. It is desired that the catalytic device is warmed-up immediately to purify the exhaust gas from an early time after the engine starting.

Figure 2:
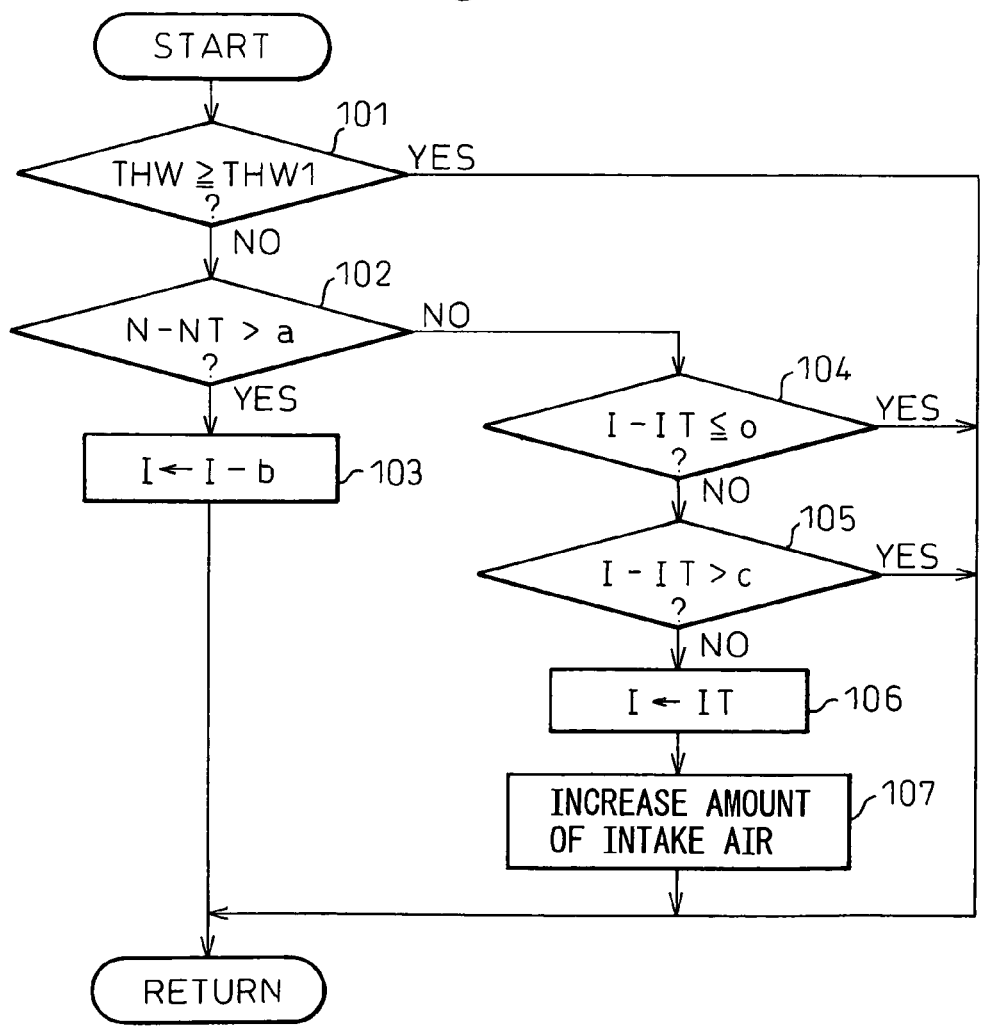
FIG. 2 is a flowchart showing an engine start control carried out by the control device according to the present invention.

FIG. 2 is a flowchart showing an engine start control carried out by a control device of the present invention. The flowchart starts when an initial combustion has been finished in each cylinder and the engine speed has exceeded a target engine speed in an idle condition. At step 101, it is determined if a temperature (THW) of engine cooling water detected by a cooling water temperature sensor (not shown) as an engine temperature is larger than a predetermined temperature (THW1). When the result is positive, the temperature of the catalytic device 14 also is not very low. Therefore, even if the temperature of the exhaust gas is not raised, the catalytic device 14 can be warmed-up immediately. Accordingly, a usual engine start control, in which the engine speed increased rapidly at the engine start is converged to the target engine speed in an idle condition by decrease of an amount of fuel, may be carried out and thus the routine is finished.

On the other hand, when the result at step 101 is negative, the temperature of the catalytic device 14 is very low and thus it is required that the temperature of the exhaust gas is raised to make the catalytic device 14 warm-up immediately.

The routine goes to step 102. At step 102, it is determined if a difference between a current engine speed (N) detected by an engine speed sensor (not shown) and the target engine speed (NT) in an idle condition is larger than a predetermined engine speed (a). The predetermined engine speed (a) is set small, and thus when the result at step 102 is negative, it is determined that the engine speed (N) converges to the target engine speed (NT).

However, initially, the result at step 102 is positive and the routine goes to step 103. At step 103, an ignition time (I) is retarded by a retard amount (b). The retard amount (b) may be a constant. However, the retard amount (b) may be a variable. For example, the larger the difference between the engine speed (N) and the target engine speed (NT) is, the larger the variable is set. Thus, the temperature of the exhaust gas is raised gradually by a feed back retard control of an ignition time (I) so that the warming-up of the catalytic device 14 is promoted. On the other hand, the engine speed (N) drops gradually by decrease of the engine output produced by the retarded ignition time (I).

Accordingly, the engine speed (N) increased rapidly at the engine start converges to the target engine speed (NT), and when the result at step 102 is negative, the routine goes to step 104. At step 104, it is determined if a difference between the current ignition time (I) and the target ignition time (IT) making the temperature of the exhaust gas rise sufficiently is equal to or smaller than (0). When the result at step 104 is positive, the current ignition time (I) is in the retard side than the target ignition time (IT) and thus the temperature of the exhaust gas is raised still more. This is of advantage to the immediately warming-up of the catalytic device 14. The ignition time (I) is maintained and the catalytic device 14 is warmed up. At this time, the engine speed (N) is maintained to converge to the target engine speed (NT).

On the other hand, when the result at step 104 is negative, at step 105, it is determined if the difference between the current ignition time (I) and the target ignition time (IT) is larger than a predetermined value (c). The predetermined value (c) is set relative large. Thus the result is usually negative and the routine goes to step 106. When the result at step 104 is negative, the current ignition time (I), i.e., the ignition time (I) when the engine speed (N) converges to the target engine speed (NT) is more on the advance side than the target ignition time (IT). Thus, the temperature of the exhaust gas is not raised sufficiently. At this time, at step 106, the ignition time (I) is retarded to the target ignition time (IT).

Therefore, the temperature of the exhaust gas is raised sufficiently and the immediately warming-up of the catalytic device 14 is surely realized. However, if nothing is done, the engine speed (N) converging to the target engine speed (NT) drops by decreasing the engine output produced by the further retardation of the ignition time. Accordingly, at step 107, the ISC valve 13 or the throttle valve 5 is opened so that an amount of intake air is increased and an amount of injected fuel is also increased thereby. Thus, the engine speed (N) is maintained at the target engine speed (NT).

Of course, the larger the difference between the current ignition time (I) and the target ignition time (IT) is, the larger the amount of intake air is increased. Namely, the larger the difference between the current ignition time (I) and the target ignition time (IT) is, the larger the opening degree of the ISC valve 13 or the throttle valve 5 is set. By the way, when the ISC valve 13 or the throttle valve 5 is opened, the increase of the amount of intake air has a relative large delayed response. Therefore, the desired amount of intake air cannot be increased instantly and thus the engine output cannot be increased instantly so as to compensate the engine output reduced by the retarded ignition time. Accordingly, it is desirable that the ignition time is retarded to the target ignition time (IT) gradually so as to correspond to the actual increase of the amount of intake air. As the result, during the ignition time is retarded to the target ignition time (IT), the engine speed (N) can be maintained at the target engine speed (NT).

By the way, the amount of injected fuel and the amount of intake air for rapidly increasing the engine speed at the engine starting are set such that the engine speed becomes the target engine speed (NT) when the ignition time becomes the target ignition time (IT). In fact, according to an individual difference of engines, as the above-mentioned, the ignition time may not become the target ignition time (IT) when the engine speed converges the target engine speed (NT). However, when the result at step 105 is positive, namely, when the difference between the ignition time (I) when the engine speed converges the target engine speed (NT) and the target ignition time (IT) is larger than the predetermined value (c) and the current ignition time (I) is remote from the target ignition time (IT), it is possible that heavy fuel, of which the vaporization becomes insufficient, is supplied to the cylinder and thus combustion deteriorates.

When the heavy fuel is used, if the ignition time is retarded to the target ignition time (IT) and the ISC valve 13 or the throttle valve 5 is opened to increase the amount of intake air as the above-mentioned, the intake port pressure approaches the atmospheric pressure and thus the vaporization of the heavy fuel deteriorates still more. As the result, the combustion deteriorates. Thus, the engine output cannot be increased so as to compensate the engine output dropped by the retarded ignition time and the engine speed (N) becomes lower than the target engine speed (NT).

Therefore, at this case, it is difficult for the ignition time (I) to be retarded to the target ignition time (IT). Thus, the amount of intake air is not increased, the ignition time (I) is maintained, and the engine speed (N) is maintained at the target engine speed (NT).

Figure 3:
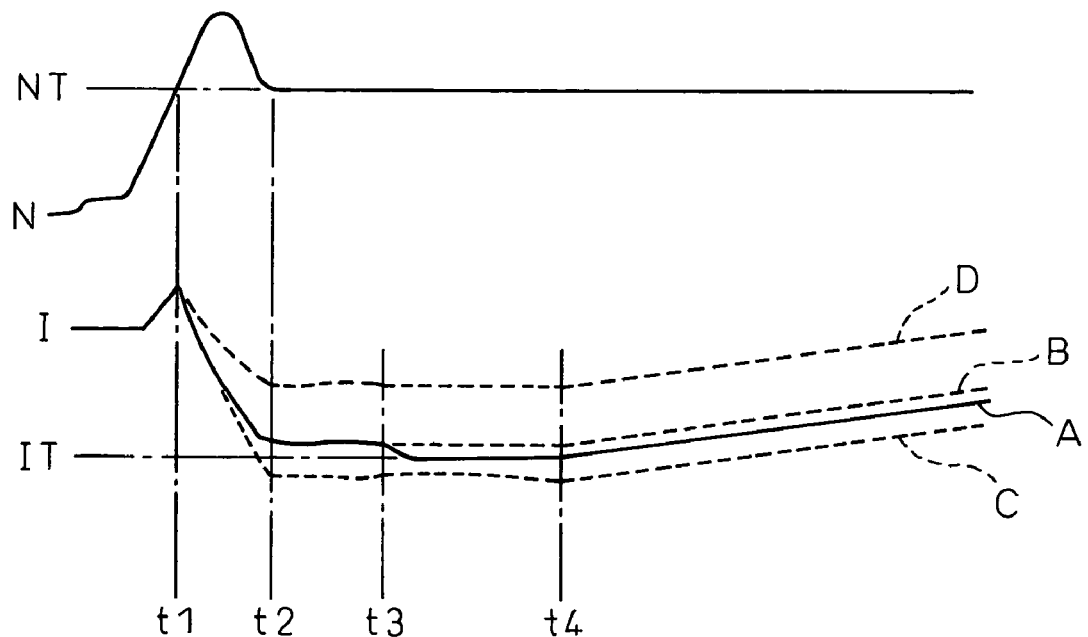
FIG. 3 is a time-chart showing changes of the engine speed and the ignition time according to the engine start control of FIG. 2.

FIG. 3 is a time-chart showing changes of the engine speed (N) and the ignition time (I) according to the engine start control of the present invention. After the initial combustion has been finished in each cylinder, the engine speed (N) exceeds the target engine speed (NT) at a time (t1). Simultaneously, the flowchart of FIG. 2 starts. In connection with the engine speed (N) that exceeds the target engine speed, the ignition time (I) is retarded gradually as shown by a solid line and the engine speed (N) converges to the target engine speed (NT) at a time (t2). In the above flowchart, at the time (t2), it is determined whether the current ignition time (I) is in the retarded side or in the advanced side compared to the target ignition time (IT). However, in fact, it is desirable to make sure of that the target engine speed (NT) is maintained by the current ignition time (I). If the engine speed (N) is lower than the target engine speed (NT) in the current ignition time (I), it is required to advance the ignition time (I).

When the engine speed (N) and the ignition time (I) are stable (change rates thereof are smaller than predetermined values) and thus it is made sure of that the target engine speed (NT) is maintained by the current ignition time (I), the above determination of the ignition time (I) is carried out at a time (t3). In the example shown by the solid line (A), according to an individual difference of engines, the current ignition time (I) is in the advance side than the target ignition time (IT).

In this case, if the ignition time (I) is maintained as shown by a dotted line (B), the temperature of the exhaust gas does not become sufficiently high and thus the warming-up of the catalytic device 14 will not be finished at a time (t4) when a predetermined period is elapsed from the time (t3) at which the warming-up should be finished. From the time (t4), the ignition time (I) is advanced gradually and thus the warming-up of the catalytic device 14 is delayed considerably.

On the other hand, according to the present engine start control, as shown by the solid line (A), at the time (t3), the ignition time (I) is retarded to the target ignition time (IT) and thus the temperature of the exhaust gas can become sufficiently high immediately after the time (t3). Therefore, at the time (t4), the warming-up of the catalytic device 14 can be surely finished. Simultaneously, the amount of intake air is increased and thus the engine speed (N) can be maintained at the target engine speed (NT).

Besides, according individual differences in engines, as shown by a dotted line (C), when the ignition time (I) at the time (t3) is in the retard side than the target ignition time (IT), the temperature of the exhaust gas becomes further sufficiently high. Therefore, the ignition time (I) is maintained and thus at the time (t4), the warming-up of the catalytic device 14 can be finished more surely. Of course, in this case, the engine speed (N) is maintained at the target engine speed (NT).

Besides, as shown by a dotted line (D), when the ignition time (I) at the time (t3) is advanced from the target ignition time (IT) more than the predetermined amount, it is possible that heavy fuel is supplied to the cylinder and combustion deteriorates due to insufficient vaporization of the fuel. In this case, the ignition time (I) is maintained and is not retarded to the target ignition time (IT) not so as to require the increase of the amount of intake air. If the amount of intake air is increased and the intake port pressure approaches the atmospheric pressure, the vaporization of the heavy fuel deteriorates still more. This can be prevented.

Although the invention has been described with reference to specific embodiments thereof, it should be apparent that numerous modifications can be made thereto, by those skilled in the art, without departing from the basic concept and scope of the invention.

What is claimed is:

1. A control device for an internal combustion engine which makes the engine speed, increased rapidly at the engine starting, converge at a target engine speed by a feed-back retard control of an ignition time, characterized in that if the ignition time when the engine speed converges at said target engine speed is on the advanced side of a target ignition time, the ignition time is retarded to said target ignition time and an amount of intake air is increased.

2. A device according to claim 1, characterized in that if the ignition time when the engine speed converges to said target engine speed is on the retard side of said target ignition time, the ignition time is maintained.

3. A device according to claim 1, characterized in that if the ignition time when the engine speed converges to said target engine speed is advanced from said target ignition time more than a predetermined amount, an amount of intake air is not increased and the ignition time is maintained.

* * * * *